(12) United States Patent
Yoon

(10) Patent No.: US 7,599,984 B2
(45) Date of Patent: Oct. 6, 2009

(54) METHOD OF EXCHANGING USER MESSAGES AMONG INTERACTIVE DISK PLAYERS

(75) Inventor: Woo Seong Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 685 days.

(21) Appl. No.: 10/802,224

(22) Filed: Mar. 16, 2004

(65) Prior Publication Data

US 2004/0205107 A1 Oct. 14, 2004

(30) Foreign Application Priority Data

Mar. 17, 2003 (KR) .................... 10-2003-0016628

(51) Int. Cl.
*G06F 15/16* (2006.01)
(52) U.S. Cl. .................. 709/200; 709/206; 725/142; 725/135; 725/136; 386/46; 386/125
(58) Field of Classification Search .............. 709/206, 709/200
See application file for complete search history.

(56) References Cited

U.S. PATENT DOCUMENTS 5,630,005 A * 5/1997 Ort ....................... 386/69
5,929,857 A 7/1999 Dinallo et al.
7,127,736 B2 * 10/2006 Kondo et al. ............... 725/93
2001/0052028 A1 12/2001 Roberts et al.
2002/0091770 A1 7/2002 Takakura et al.
2002/0178011 A1 11/2002 Yotoriyama et al.
2002/0198844 A1 * 12/2002 Ohmori et al. ............. 705/51

FOREIGN PATENT DOCUMENTS

| EP | 1073238 A2 | 1/2001 |
|----|---|---|
| JP | 10-136314 A | 5/1998 |
| WO | WO-00/63915 A1 | 10/2000 |
| WO | WO-01/65358 A2 | 9/2001 |
| WO | WO-03/010964 A2 | 2/2003 |
| WO | WO-03/096175 A1 | 11/2003 |
| WO | WO-03/105018 A1 | 12/2003 |

* cited by examiner

*Primary Examiner*—Jude J Jean Gilles
(74) *Attorney, Agent, or Firm*—Birch, Stewart, Kolasch & Birch, LLP

(57) ABSTRACT

A method of exchanging user messages among interactive disk players through an external server is disclosed. The external server receives a user message from a first interactive disk player and stores the user message in an internal memory. Receiving a message request from a second interactive disk player, the external server compares playback time included in the message request and playback time included in the stored user message and sends the stored user message to the second interactive disk player if the two playback times are almost the same. The method allows users of individual interactive disk players to exchange opinions about the same DVD title irrespective of their individual playing positions.

31 Claims, 2 Drawing Sheets

METHOD OF EXCHANGING USER MESSAGES AMONG INTERACTIVE DISK PLAYERS

FOREIGN PRIORITY

The present invention claims priority under 35 U.S.C. 119 on Korean Application No. 10-2003-016628 filed Mar. 17, 2003; the contents of which are incorporated by reference in their entirety.

BACKGROUND OF THE INVENTION

1. Field of the Invention

The present invention relates to a method of exchanging user messages among interactive disk players through a server.

2. Description of the Related Art

As recording media technology advances, high-density optical disks capable of recording large amounts of digital data have become available, which allows easy distribution of digital contents using the digital recording media.

The standardization of interactive disks, wherein auxiliary data related to the playback of A/V data recorded on a disk (control or additional information referred to as ENAV data) is recorded on the same disk as html (hyper-text markup language) or jpeg data files and at the request of a user the ENAV data is reproduced along with the related A/V data, has been progressing rapidly. It is expected that the standardization of such interactive disks will promote the distribution of digital contents.

Users watching interactive disks storing the same title may possibly desire to exchange opinions regarding the title. In this perspective, it is necessary to support the exchange of user messages among interactive disk players through a server.

To allow the exchange of opinions, enquiries, and responses about the same title, it is required that the playback position of the disks that are being played by individual players be identical. In other words, the playback of the interactive disk players needs to be synchronized.

To this end, the disk player of a new user who does not belong to a group of users who simultaneously started the playback of a title under the control of a server should play the title from the playback position of the user group based on playback position and time information provided by the server, not from the beginning.

The synchronized playback of the title makes it possible for the users to exchange messages regarding the scene that is being currently played but the new user should skip some part of the title for the synchronization.

SUMMARY OF THE INVENTION

It is an object of the present invention to provide a method that allows the exchange of user messages regarding an arbitrary scene of a title that is being individually played by a plurality of interactive disk players.

A method of exchanging user messages among interactive disk players in accordance with an embodiment of the present invention comprises the steps of (a) receiving a user message from a first interactive disk player and storing the received user message, (b) receiving a message request from a second interactive disk player, and (c) comparing playback time included in the message request with playback time included in the stored user message and sending the stored user message to the second interactive disk player depending on the comparison result.

A method of exchanging user messages among interactive disk players in accordance with another embodiment of the present invention comprises (a) receiving and storing a user message that was sent from a different interactive disk player and received by and stored in an external server from the external server by sending a message request to the external server, and (b) comparing playback time included in the stored user message with the time that has elapsed since the start of the playback of an interactive disk and outputting the stored user message for displaying the message depending on the comparison result.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

In order that the invention may be fully understood, preferred embodiments thereof will now be described with reference to the accompanying drawings.

Figure 1:
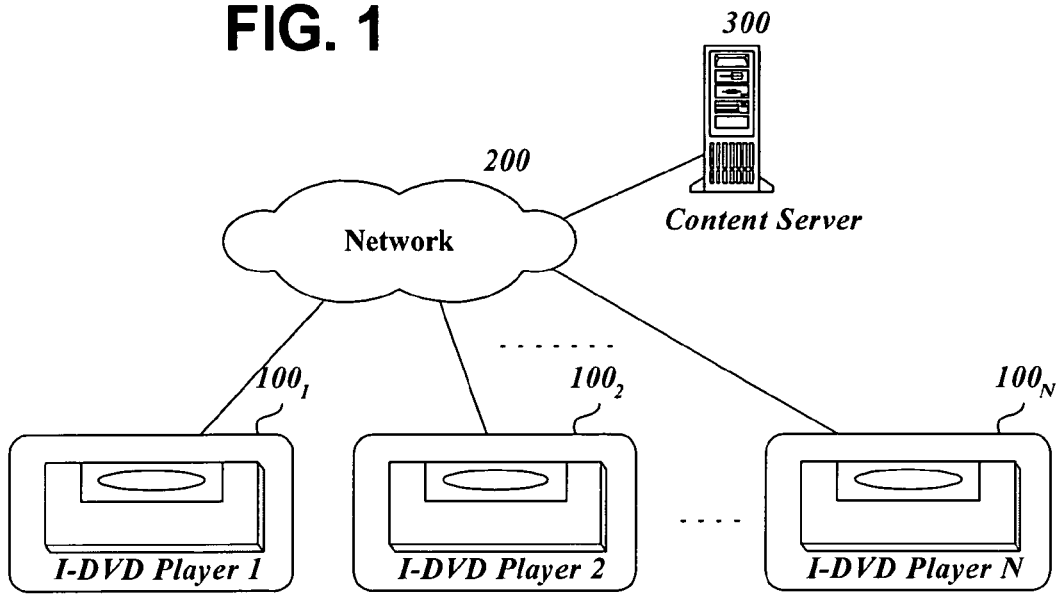
FIG. 1 illustrates a system in which the present invention may be advantageously embodied.

FIG. 1 illustrates a system in which the present invention may be advantageously embodied. The system comprises a plurality of DVD players $100_k$ capable of playing interactive DVDs, a content server 300 that provides auxiliary contents related to the interactive DVDs played by the DVD players and that allows the exchange of user messages among the DVD players, and a network 200 that serves as a data route between them.

Figure 2:
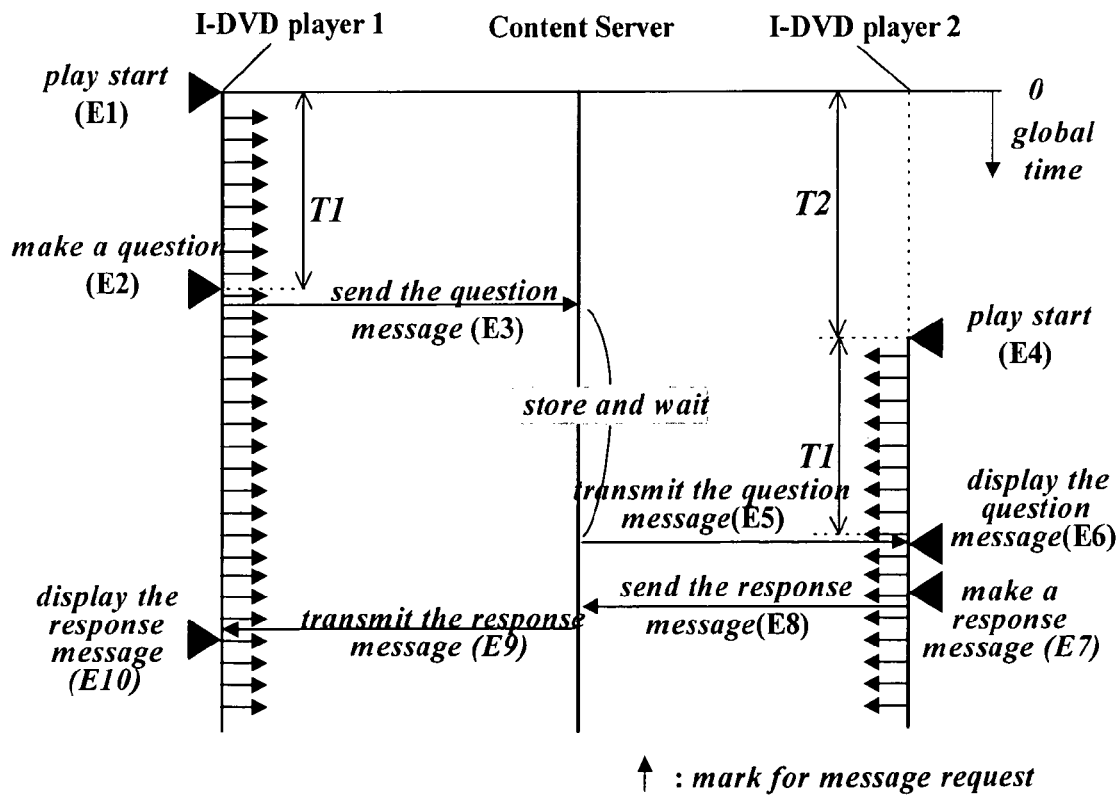
FIG. 2 illustrates a schematic diagram of an embodiment of a method of exchanging user messages among interactive disk players in accordance with the present invention.

FIG. 2 illustrates a schematic diagram of an embodiment of a method of exchanging user messages among interactive disk players in accordance with the present invention.

If a first user requests playback of an interactive DVD by loading the DVD into a first DVD player $100_1$, the first DVD player $100_1$ starts the playback of the DVD after reading ENAV data recorded thereon or receiving ENAV data thereof from the content server 300 and storing the ENAV data in an internal memory (E1).

The interactive player $100_1$ keeps track of the passage of playback time using a timer. The playback operation is as described below.

As the interactive DVD is reproduced, A/V data recorded thereon is buffered in a buffer and the buffered A/V data is decoded by an A/V decoder and outputted as an A/V signal. During the A/V data decoding, specific ENAV data related to the A/V data being decoded among the whole ENAV data stored in the internal memory is decoded simultaneously and outputted as a video signal, which will be mixed with the video signal of the A/V signal. This process enables the first user to see the main A/V data of the DVD title and related auxiliary data simultaneously.

During the reproduction, the DVD player $100_1$ sends a message request to the server 300 periodically. The message request includes the ID of the disk that is currently being played, a user ID, and the time that has elapsed since the start of the playback (hereinafter referred to as relative time). The message request may further include a playback region, a used language, a user age, and user sex as user grouping information, depending on the information option selected by the user ahead of the playback.

Each time the server 300 receives a message request, the server 300 checks if a message frame including the same disk ID (or title ID) and group information as the message request has been received from other DVD players. If so, depending on the type of the message frame, the server 300 sends the message frame to the requesting player, i.e., the first DVD player $100_1$ immediately or determines whether to send the message frame to the first DVD player $100_1$ based on the result of the comparison of the relative time included in the message frame with the relative time included in the message request.

If the first user enters a message inquiring about a particular scene of a movie that he/she sees (e.g., the name of an actor/actress or shooting location) during the reproduction and request operation (E2), the first DVD player $100_1$ adds to the message the relative time i.e., the time that has elapsed since the playback start (T1 in FIG. 2), that has been kept track of by the internal timer, grouping information, and the message type. The message type is determined automatically or by the user input and includes a question, a response, a comment, etc. In this example, the type of the message is a question.

Figure 3:
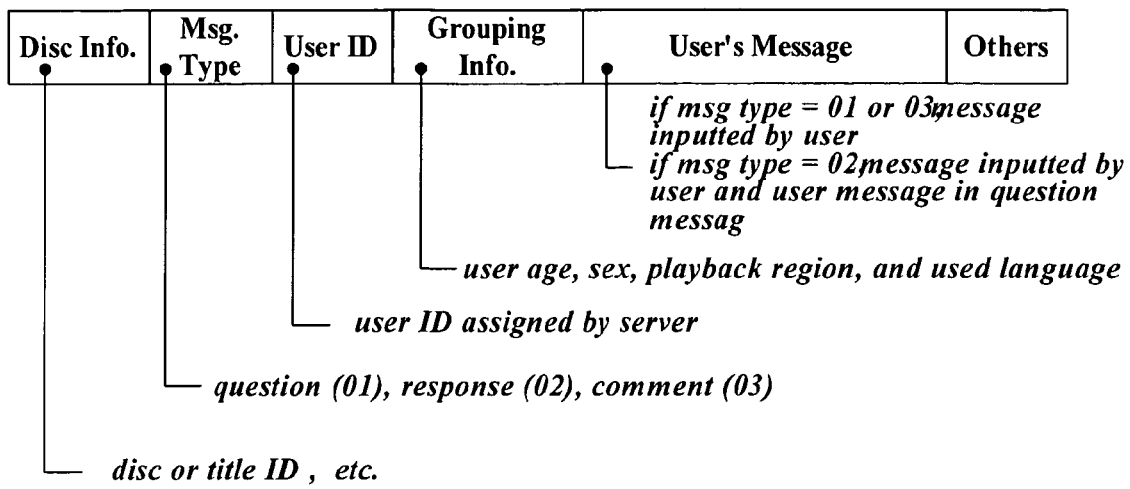
FIG. 3 illustrates the frame format of a message exchanged between an interactive disk player and a content server.

FIG. 3 illustrates an example of a user message frame constructed this way.

Receiving the message frame sent by the first DVD player $100_1$ through the network 200 (E3), the content server 300 stores the received message frame in its database. Each time a message request is received from a DVD player, the content server 300 searches the database for the stored message frame and sends the stored message frame to the requesting DVD player. If the user ID included in the message request is the same as the user ID included in the stored message frame, the content server 300 does not send the message frame to the requesting DVD player since the message request and message frame were created by the same user. Otherwise, depending on the type of the message frame, the server 300 sends the message frame to the requesting DVD player immediately or determines whether to send the message frame to the requesting DVD player by comparing the relative times of the message request and the message frame.

If a second user having the same grouping information as the first user starts playback of the same DVD title using a second DVD player $100_2$ some time (T2 in FIG. 2) after the first user started playback (E4), the second DVD player $100_2$ reproduces the A/V data and the related auxiliary contents and sends a message request to the content server 300 periodically, like the first DVD player $100_1$.

Receiving the message request from the second DVD player $100_2$, the content server 300 searches its database for a message frame having the same disk ID and grouping information as the received message request and examines the type of the message frame. If the type is either a response or a comment, the content server 300 sends the message frame to the requesting DVD player. (i.e., the second DVD player $100_2$) immediately.

If the type of the message frame corresponds to a question, the content server 300 compares the relative time included in the message frame and the relative time included in the message request. If the relative time of the stored message frame is shorter than or equal to the relative time of the message request, the content server 300 sends the message frame to the requesting DVD player. In the example of FIG. 2, the type of the message created by the first user is a question and therefore the second DVD player $100_2$ receives the message created by the first player $100_1$ some time (T1) after the second DVD player $100_2$ started playback (E5).

The second DVD player $100_2$ displays the user message contained in the received message frame in a window other than the window in which the title is being displayed (E6). The second user, therefore, can see the question made by the first user at the same (or at least nearby) scene where the first user made the question, whereby the second user can easily understand the intent of the question.

If the second user wants to answer the question of the first user and requests a response, the second DVD player $100_2$ displays a response window and receives the response of the second user. The second DVD player $100_2$ constructs a response message frame using the inputted message (E7).

The response message frame also includes the disk ID and grouping information as was described above. The type of the message frame corresponds to a response. In addition to the received user message, the message included in the question message frame is included in the response message frame. The response message frame is transmitted to the content server 300 through the network 200 (E8).

Receiving the response message frame, the content server 300 stores the response message frame in its database and then sends it to the DVD players issuing a message request users of which belong to the same user group. Since a response message frame is supposed to be transmitted to a requesting DVD player immediately, the response message frame is transmitted to the first DVD player $100_1$ when the first DVD player $100_1$ issues a message request (E9)

Receiving the response message frame, the first DVD player $100_1$ outputs the user message contained in the message frame in a message window (E10). The user message includes not only the response inputted by the second user but also the question that was made by the first user and thus the question and the response are displayed together in the window. The first user, therefore, can easily understand what question is associated with the response though the current playback position (about T1+T2) does not coincide with the playback position when the question was made (T1).

Although playback times of individual DVD players are not the same, users of the DVD players are able to synchronize their question with a playback scene and to receive a response regarding the question by using the message exchange method described thus far.

Messages that are irrelevant to questions or responses regarding a DVD title (e.g., an announcement or notice to be sent to the group of users who are watching the DVD title) are sent to the content server 300 with the type of the messages set to 'a comment'.

A message frame the type of which is a comment is sent to the related DVD players immediately on request without regard to the relative time.

Figure 4:
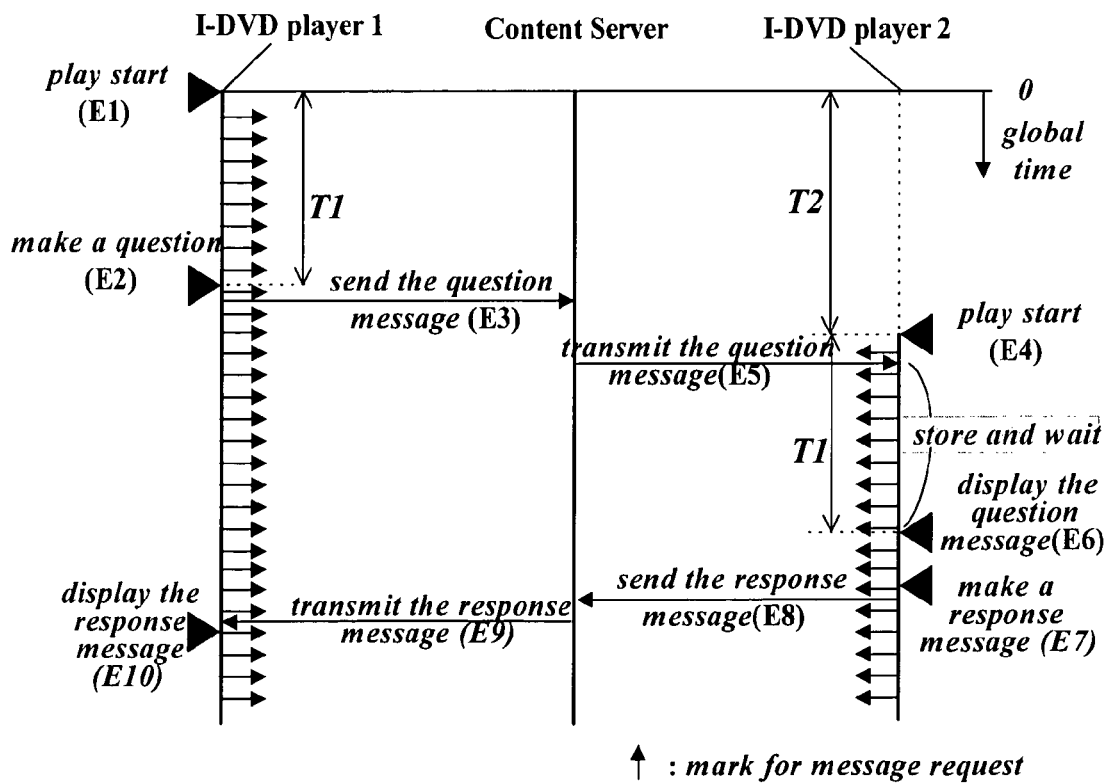
FIG. 4 illustrates a schematic diagram of another embodiment of a method of exchanging user messages among interactive disk players in accordance with the present invention.

FIG. 4 illustrates a schematic diagram of another embodiment of a method of exchanging user messages among interactive disk players in accordance with the present invention.

In this embodiment, when to send a question message frame to users is not controlled by the content server 300 but controlled by the individual DVD players $100_k$.

The content server 300 sends all message frames that have been received and stored (E3) to requesting DVD players irrespective of the type of the message frames (E5).

A DVD player that receives a message frame examines the type of the message frame and immediately displays the received message frame that corresponds to a response or a comment in a message window. If the received message frame corresponds to a response, the DVD player keeps comparing the relative time included in the message frame with the current playback time that has been kept track of by the timer until the two values become identical.

If the relative time included in the message frame becomes equal to or exceeds the current playback time, the DVD player displays the user message included in the message frame in a message window (E6).

The remaining steps E7 through E10 are the same as was described above with reference to FIG. 2.

The method of exchanging user messages among interactive disk players in accordance with the present invention allows users watching the same DVD title individually to exchange opinions about the DVD title with one another in a way that the opinions can be synchronized with the scenes of the title.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

What is claimed is:

1. A method of exchanging user messages among interactive disk players, comprising the steps of:
   receiving a user message from a first interactive disk player;
   receiving a message request from a second interactive disk player;
   comparing a playback time included in the message request with a playback time included in the user message to produce a comparison result; and
   determining whether or not to send the user message to the second interactive disk player depending on said comparison result.

2. The method set forth in claim 1, wherein the user message includes
   interactive disk identification information or program title information, and
   user grouping information.

3. The method set forth in claim 1, wherein the message request includes
   interactive disk identification information or program title information, and
   user grouping information.

4. The method set forth in claim 2 or claim 3, wherein the user grouping information includes information on an age, a sex, a playback region, or a language of a user.

5. The method set forth in claim 1, wherein the step of comparing comprises:
   comparing the playback time included in the message request with the playback time included in the user message if the user message and the message request were created by interactive disk players belonging to a common group.

6. The method set forth in claim 1, wherein the playback time included in the message request and the playback time included in the user message each are a time that has elapsed since a start of a playback of an individual interactive disk by a respective one of the interactive disk players.

7. The method set forth in claim 1, wherein the step of determining comprises:
   determining to send the user message if the playback time included in the message request approaches the playback time included in the user message within a predetermined bound.

8. The method set forth in claim 1, wherein the step of comparing comprises:
   comparing the playback time included in the message request with the playback time included in the user message if the user message is intended for requesting a response from other arbitrary users.

9. The method set forth in claim 8, further comprising:
   sending the user message to the second interactive disk player immediately without comparing the playback times included in the message request and the user message if the message is not intended for requesting a response from other arbitrary users.

10. A method of exchanging user messages among interactive disk players, conducted by an interactive disk player, comprising the steps of:
    sending a message request to an external server;
    receiving from the external server a user message that was sent to the external server from a different interactive disk player;
    comparing a playback time included in the user message with a time that has elapsed since a start of the step of playing to produce a comparison result; and
    determining whether or not to display the user message based on said comparison result.

11. The method set forth in claim 10, wherein the message request includes
    interactive disk identification information or program title information, and
    user grouping information.

12. The method set forth in claim 11, wherein the user grouping information includes information on an age, a sex, a playback region, or a language of a user.

13. The method set forth in claim 10, wherein the playback time is a time that has elapsed since a start of a playback of an interactive disk by the different interactive disk player.

14. The method set forth in claim 10, wherein the step of determining comprises:
    determining to display the user message if a time that has elapsed since a start of playback by the interactive disk player approaches the playback time included in the user message within a predetermined bound.

15. The method set forth in claim 10, wherein the step of comparing comprises:
    comparing the playback time and the elapsed time if the user message is intended for requesting a response from other arbitrary users.

16. The method set forth in claim 15, further comprising:
    displaying the user message immediately without comparing the playback time and the elapsed time if the user message is not intended for requesting a response from other arbitrary users.

17. The method set forth in claim 10, further comprising the step of:
    after the user message is displayed, sending a message inputted by a user along with the displayed user message to the external server.

18. The method set forth in claim 17, wherein the inputted and sent message each comprises a message type that does not include a request a response.

19. A system for exchanging user messages among interactive disk players, comprising:

a first interactive disk player;

a second interactive disk player; and an external server connected to the two interactive disk players by a network, the external server configured to receive a user message from the first interactive disk player and send the user message to the second interactive disk player, wherein the external server is configured, to receive a message request from the second interactive disk player, to compare a playback time included in the message request with a playback time included in the user message to produce a comparison result, and to determine whether or not to send the user message to the second interactive disk player depending on the comparison result.

20. The system set forth in claim 19, wherein the user message and the message request each include interactive disk identification information or program title information, and user grouping information.

21. The system set forth in claim 20, wherein the user grouping information includes information on an age, a sex, a playback region, or a language of a user.

22. The system set forth in claim 20, wherein the external server is configured to determine whether the first and second interactive disk players belong to a common group based on the user grouping information.

23. The system set forth in claim 19, wherein the external server is configured to send the user message if the playback time included in the message request approaches the playback time included in the user message within a predetermined bound.

24. The system set forth in claim 19, wherein the external server is configured to compare the playback time included in the message request with the playback time included in the user message if the user message is intended for requesting a response from other interactive disk players.

25. An interactive disk player for exchanging user message with another interactive disk player, said interactive disk player being configured to send a message request to an external server and to receive a user message from the external server, the user message being sent from another interactive disc player via the external server, wherein said interactive disk player is configured to compare a playback time included in the user message with a time that has elapsed since a start of playback of an interactive disk, and to determine whether or not to display the user message based on said comparison.

26. The player set forth in claim 25, wherein the user message and the message request each include interactive disk identification information or program title information, and user grouping information.

27. The player set forth in claim 25, wherein said interactive disk player is configured to output the user message to a display if a time that has elapsed since a start of a playback by the interactive disk player approaches the playback time included in the user message within a predetermined window.

28. The player set forth in claim 25, wherein said interactive disk player is configured to compare the playback time and the elapsed time if the user message is intended for requesting a response from another interactive disk player.

29. The player set forth in claim 25, wherein said interactive disk player is configured to display the user message immediately without comparing the playback time and the elapsed time if the user message is not intended for requesting a response from another interactive disk players.

30. The player set forth in claim 25, wherein said interactive disk player is configured, after displaying the user message, to send a message inputted by a user along with the displayed user message to the external server.

31. The player set forth in claim 30, wherein the inputted and sent message is of a type that does not request a response from another interactive disk player.

* * * * *